(12) United States Patent
Moseke

(10) Patent No.: US 11,529,881 B2
(45) Date of Patent: Dec. 20, 2022

(54) TEMPERATURE-MONITORED LOAD CONTACT MODULE AND COOLED CHARGING PLUG

(71) Applicant: PHOENIX CONTACT E-Mobility GmbH, Schieder-Schwalenberg (DE)

(72) Inventor: Dirk Moseke, Höxter-Lüchtringen (DE)

(73) Assignee: PHOENIX CONTACT E-Mobility GmbH, Schieder-Schwalenber (DE)

(*) Notice: Subject to any disclaimer, the term of this patent is extended or adjusted under 35 U.S.C. 154(b) by 75 days.

(21) Appl. No.: 16/768,108

(22) PCT Filed: Dec. 11, 2018

(86) PCT No.: PCT/EP2018/084365
§ 371 (c)(1),
(2) Date: May 29, 2020

(87) PCT Pub. No.: WO2019/115529
PCT Pub. Date: Jun. 20, 2019

(65) Prior Publication Data
US 2020/0290468 A1 Sep. 17, 2020

(30) Foreign Application Priority Data
Dec. 14, 2017 (DE) .......................... 102017222808.3

(51) Int. Cl.
*B60L 53/16* (2019.01)
*H01R 13/66* (2006.01)
(52) U.S. Cl.
CPC .......... *B60L 53/16* (2019.02); *H01R 13/6683* (2013.01)

(58) Field of Classification Search
CPC combination set(s) only.
See application file for complete search history.

(56) References Cited

U.S. PATENT DOCUMENTS

| 5,600,306 A * | 2/1997 | Ichikawa | H01R 13/7137 340/584 |
| 9,282,680 B2 * | 3/2016 | Murphy | H05K 7/20409 |
| 10,256,579 B2 * | 4/2019 | Fuehrer | H01R 13/6683 |

(Continued)

FOREIGN PATENT DOCUMENTS

| DE | 202015106844 U1 | 3/2016 |
| DE | 102016001572 A1 | 8/2017 |

(Continued)

OTHER PUBLICATIONS

International Preliminary Report on Patentability (translation) Application No. PCT/EP2018/084365 dated Jun. 12, 2020 9 pages.

(Continued)

*Primary Examiner* — Renee S Luebke
*Assistant Examiner* — Milagros Jeancharles
(74) *Attorney, Agent, or Firm* — Whitmyer IP Group, LLC

(57) ABSTRACT

A load contact module for a charging plug-in connection includes: a load contact, which is designed to electromechanically contact a load contact to be inserted and/or slid on; a mounting portion, which is designed to connect the load contact module to a support of a charging plug and/or of a charging socket; and a temperature sensor for the temperature monitoring of a charging process, wherein the temperature sensor has a distance from the mounting portion.

9 Claims, 4 Drawing Sheets

(56) References Cited

U.S. PATENT DOCUMENTS

2012/0065923 A1* 3/2012 Whiteley ................. G01K 7/13
                                                        702/130
2016/0104978 A1* 4/2016 Chaumeny ......... H01R 13/6683
                                                      439/620.22
2019/0334293 A1* 10/2019 Iwami ..................... B60L 53/16

FOREIGN PATENT DOCUMENTS

| DE | 102016204895 A1 | 9/2017 | |
|----|---|---|---|
| DE | 102016107409 A1 * | 10/2017 | ............. B60L 53/18 |
| DE | 102016206914 A1 | 10/2017 | |
| DE | 202018002686 U1 | 7/2018 | |
| DE | 102017108526 A1 | 10/2018 | |
| GB | 2489988 * | 10/2012 | |
| JP | 2002352635 A | 12/2002 | |
| WO | 0213330 A1 | 2/2002 | |
| WO | 2014032906 A1 | 3/2014 | |
| WO | 2016169940 A1 | 10/2016 | |
| WO | 2017162651 A1 | 9/2017 | |

OTHER PUBLICATIONS

International Search Report and Written Opinion of the International Searching Authority Application No. PCT/EP2018/084365 Completed: Mar. 25, 2019; dated Apr. 5, 2019 11 pages.

* cited by examiner

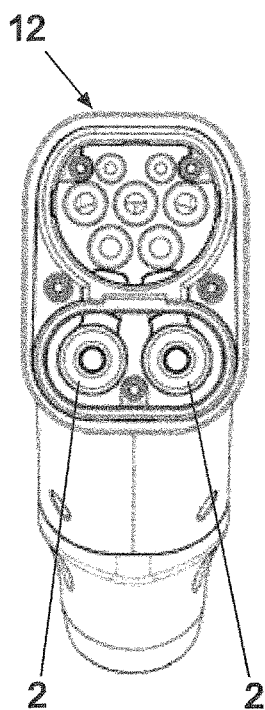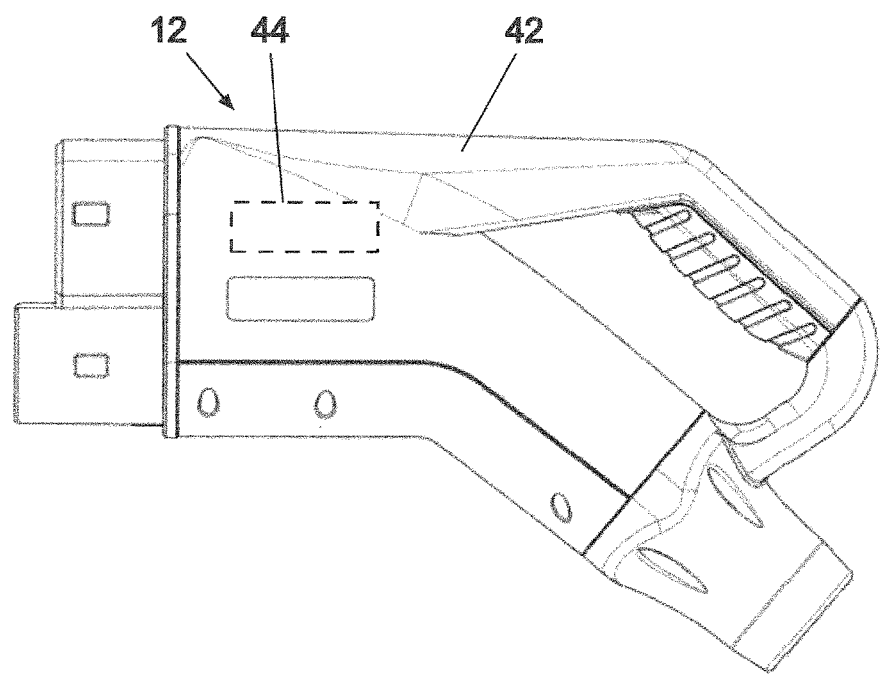
Fig. 2A
Fig. 2B
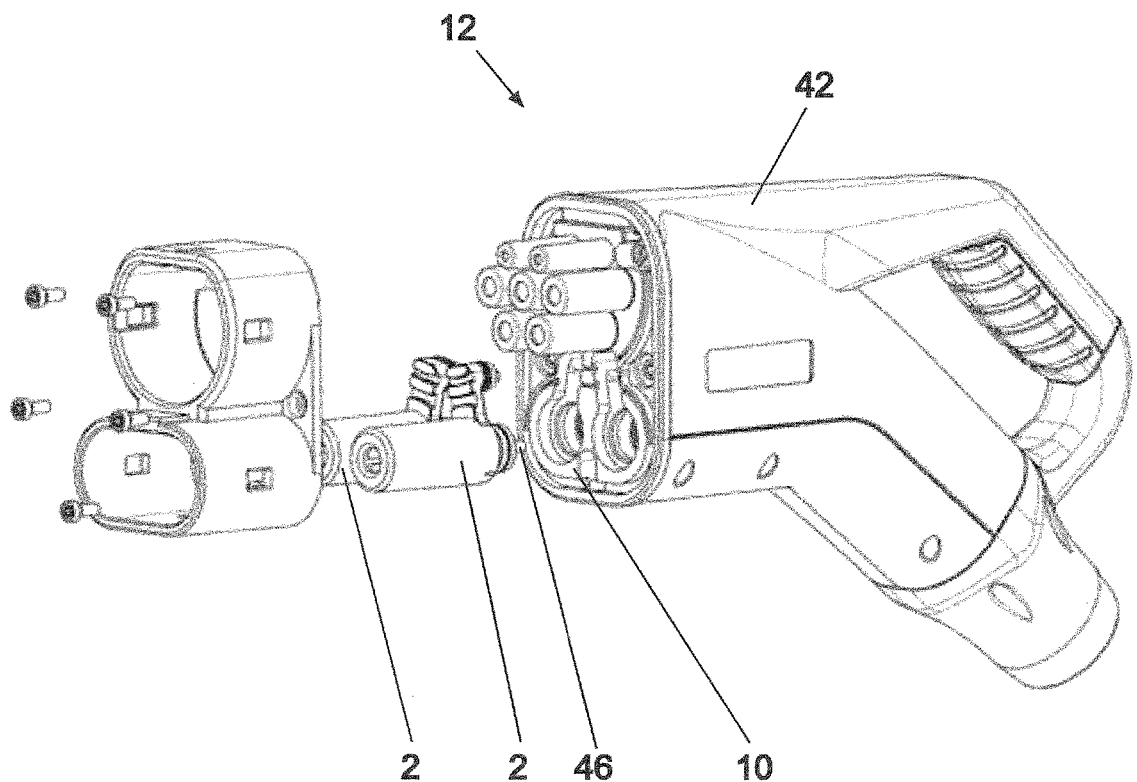
Fig. 2C

TEMPERATURE-MONITORED LOAD CONTACT MODULE AND COOLED CHARGING PLUG

TECHNICAL FIELD

The present invention relates to a load-contact module for a plug-in charging connection, comprising a load contact, which is designed to electromechanically contact a load contact to be inserted and/or slid on, comprising a mounting portion, which is designed to connect the load-contact module to a support of a charging plug and/or of a charging socket, and comprising a temperature sensor for the temperature monitoring of a charging process. The invention also relates to a charging plug comprising at least one such load-contact module.

BACKGROUND

The traction battery of a motor vehicle driven only by an electric motor or of a hybrid vehicle is usually charged via a plug-in charging connection, which is formed between a charging plug of a charging station and a vehicle-side charging socket. Here, one or more temperature sensors may be provided for the temperature monitoring of the charging process in order to prevent overheating and associated damage to the charging station or the vehicle. A load-contact module of the type mentioned at the outset is known from the German patent application having the application number 10 2017 108 526.2, for example.

In order to make it possible to transfer higher charging power over the standard plug-in charging connections, charging plugs, charging sockets or even lines are actively and/or passively cooled. In this case, the challenge is that of monitoring the temperature that is actually present in the region of the electromechanical contact of the plug-in charging connection, since the measured values from a temperature sensor may be affected by a cooling device.

Against this background, the technical problem addressed by the invention is to provide a load-contact module and a charging plug of the type mentioned at the outset which allow for reliable temperature monitoring of an electromechanical contact region of a plug-in charging connection, the plug-in charging connection being formed in particular by means of one or more cooled components.

SUMMARY

The above-described technical problem is solved both by a load-contact module as disclosed and a charging plug as disclosed. Other embodiments of the invention are found in the following description.

According to a first aspect, the invention relates to a load-contact module for a plug-in charging connection, comprising a load contact, which is designed to electromechanically contact a load contact to be inserted and/or slid on, comprising a mounting portion, which is designed to connect the load-contact module to a support of a charging plug and/or of a charging socket, and comprising a temperature sensor for the temperature monitoring of a charging process, the temperature sensor being at a distance from the mounting portion.

Since, when the load-contact module has finished being mounted, the mounting portion is arranged in the vicinity of cooling devices and/or cooled components of a charging plug and/or a charging socket, the temperature sensor is spaced apart from the mounting portion in order to reduce or prevent the measured values from the temperature sensor being affected by active and/or passive cooling devices of a charging plug and/or a charging socket.

Owing to the temperature sensor being spaced apart from the mounting portion, the load-contact module therefore allows for temperature monitoring of a charging process in a reliable manner without the measured values from the temperature sensor being significantly impacted by passive and/or active cooling devices.

According to another embodiment of the load-contact module, the temperature sensor may be received in a thermally conductive plastics material and/or may be cast in a thermally conductive plastics material at least in part. Therefore, the temperature sensor can be securely received by the plastics material within the load-contact module in a protected manner, the thermal conductivity of the plastics material ensuring thermal coupling to surrounding components such that reliable temperature monitoring can take place.

The load contact of the load-contact module may have a first end which is associated with the mounting portion and a second end which is remote from the first end, a distance between an end face of the load contact formed at the second end of the load contact and the mounting portion being smaller than the distance between the temperature sensor and the mounting portion. The load contact may for example be a pin contact or socket contact projecting from the mounting portion. Owing to the fact that the load contact having an axially projecting length is arranged between the temperature sensor and the mounting portion, as large as possible distance between the temperature sensor and the mounting portion can be achieved. This also means that this arrangement produces a large distance between the temperature sensor and, where applicable, components of a charging plug and/or a charging socket that are cooled when the load-contact module has finished being mounted.

According to another embodiment of the load-contact module, it may be provided that the temperature sensor is arranged between the end face of the load contact and a collar of a housing of the load-contact module, which collar defines an insertion opening. In turn, this structural configuration is intended to produce as large as possible a distance between the temperature sensor and any components that are cooled in the finished mounted state.

According to another embodiment of the load-contact module, it is provided that the mounting portion has an end surface which forms an axial stop for mounting the load-contact module on the support, the distance between the temperature sensor and the mounting portion being an axial distance between the temperature sensor and the end surface of the mounting portion. Therefore, the axial distance of the temperature sensor may for example be formed relative to a circular circumferential planar end face, which acts as a stop for a screwed connection formed between the load contact and the support.

The load-contact module may be configured to be interchangeably and detachably fastened to a support of a charging plug and/or a charging socket. For this purpose, screwed connections and/or pin connections or any other suitable detachable connection can be used, for example.

According to another embodiment of the load-contact module, the load-contact module may comprise a thermally conducting contact spring, which is designed to abut a load contact, the contact spring being provided to conduct heat in the direction of the temperature sensor. The contact spring may in particular be a round-wire contact spring.

The contact spring may be configured to abut a load contact to be inserted and/or slid on over the periphery. Alternatively, the contact spring may be configured to abut the load contact of the load-contact module or to be connected thereto.

For example, it may be provided that a round-wire contact spring is associated with an insertion opening in the load-contact module, the insertion opening being provided for inserting a pin contact into a load contact of the load-contact module designed as a socket contact. When inserting the pin contact into the insertion opening, the round-wire contact spring abuts an outer lateral surface of the pin contact over the periphery such that, when the pin contact heats up as a result of the charging process, the round-wire contact spring heats up as well.

In order to achieve reliable thermal conduction from the thermally conducting contact spring to the temperature sensor, it may be provided that the temperature sensor is connected to the contact spring via a thermally conducting connection element.

According to another embodiment of the invention, it may be provided that the contact spring abuts the thermally conductive plastics material in which the temperature sensor is cast or is received at least in part.

It may be provided that a round-wire contact spring sits in a circular circumferential groove formed in the thermally conductive plastics material.

According to another embodiment of the load-contact module, the load contact is a socket contact, which has an opening for inserting a pin contact, the load contact being surrounded over the periphery by an insulation housing, a flexible conducting track being guided on a lateral surface of the insulation housing facing away from the load contact, and the flexible conducting track being coupled to the temperature sensor and the flexible conducting track being guided from the temperature sensor to a printed circuit board and being connected to the printed circuit board.

Therefore, measured values detected by the temperature sensor can be easily and reliably transmitted to an interface which is e.g. formed on the mounting portion and is coupled to the printed circuit board, the interface in turn being configured to transmit measured data to the support of a charging plug and/or a charging socket.

In this way, measured values detected by the load-contact module can be transmitted to a charging station connected to a charging plug or to a vehicle connected to a charging socket and to corresponding control devices for controlling the charging process.

The distance between the temperature sensor and the mounting portion may be 10 mm or greater. In particular, the distance between the temperature sensor and the mounting portion may be 20 mm or greater.

In particular, the axial distance measured along the longitudinal axis between the temperature sensor and a stop surface and/or mounting surface or end surface of the mounting portion may be 10 mm or greater. In particular, this axial distance may be 20 mm or greater.

BRIEF DESCRIPTION OF THE DRAWINGS

The invention is described in greater detail in the following with reference to the accompanying drawings schematically showing embodiments, and in which:

FIG. 2A is a front view of a charging plug according to the invention;

FIG. 2B is a side view of the charging plug from FIG. 2A;

FIG. 2C is a perspective view of the charging plug from FIG. 2A, with part of the charging plug being shown in an exploded view.

DETAILED DESCRIPTION

Figure 1A:
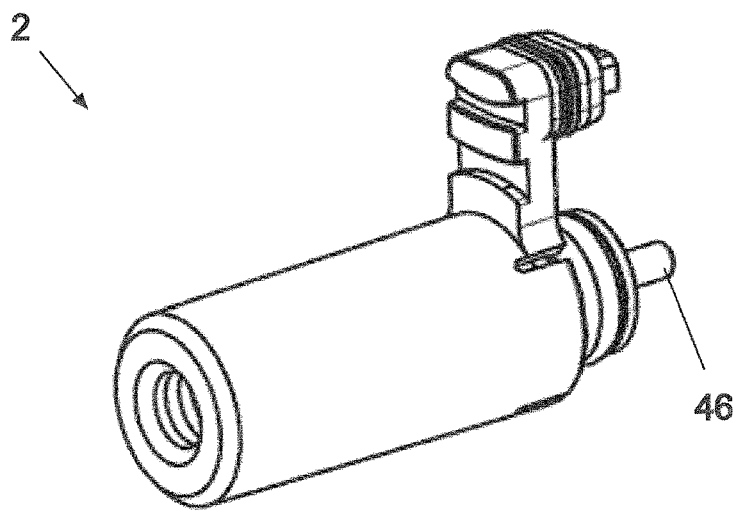
FIG. 1A is a perspective view of a load-contact module according to the invention.
Figure 1B:
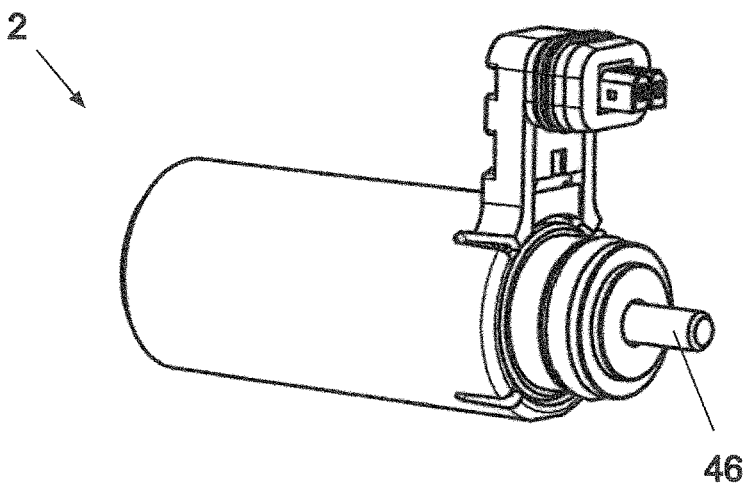
FIG. 1B is another perspective view of the load-contact module from FIG. 1A.
Figure 1C:
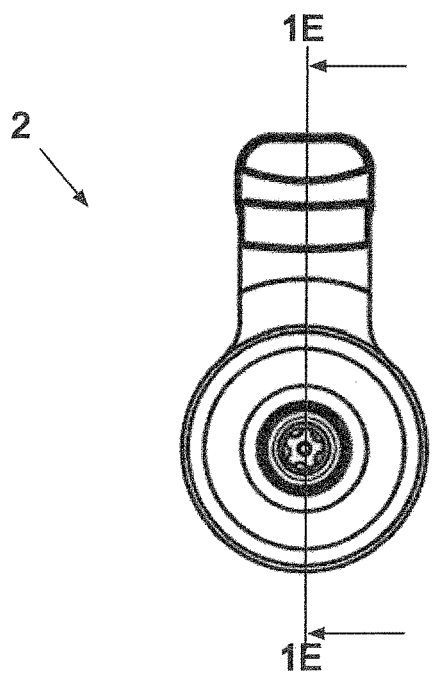
FIG. 1C is a front view of the load-contact module from FIG. 1A.
Figure 1D:
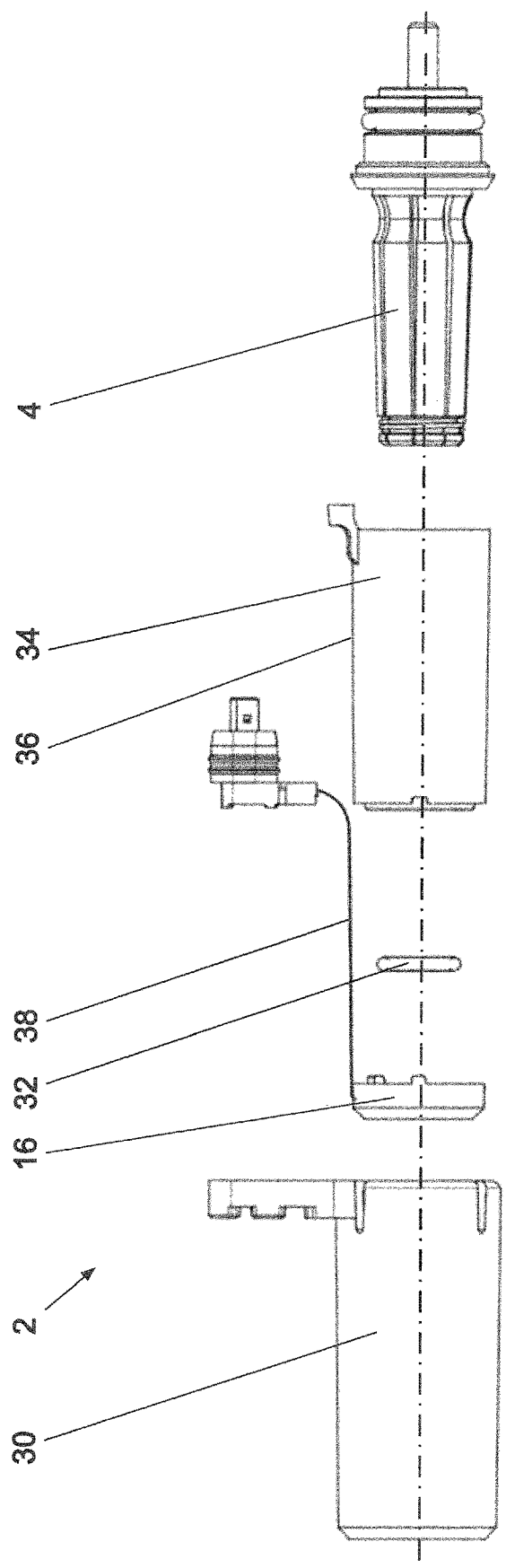
FIG. 1D is an exploded side view of the load-contact module from FIG. 1A.
Figure 1E:
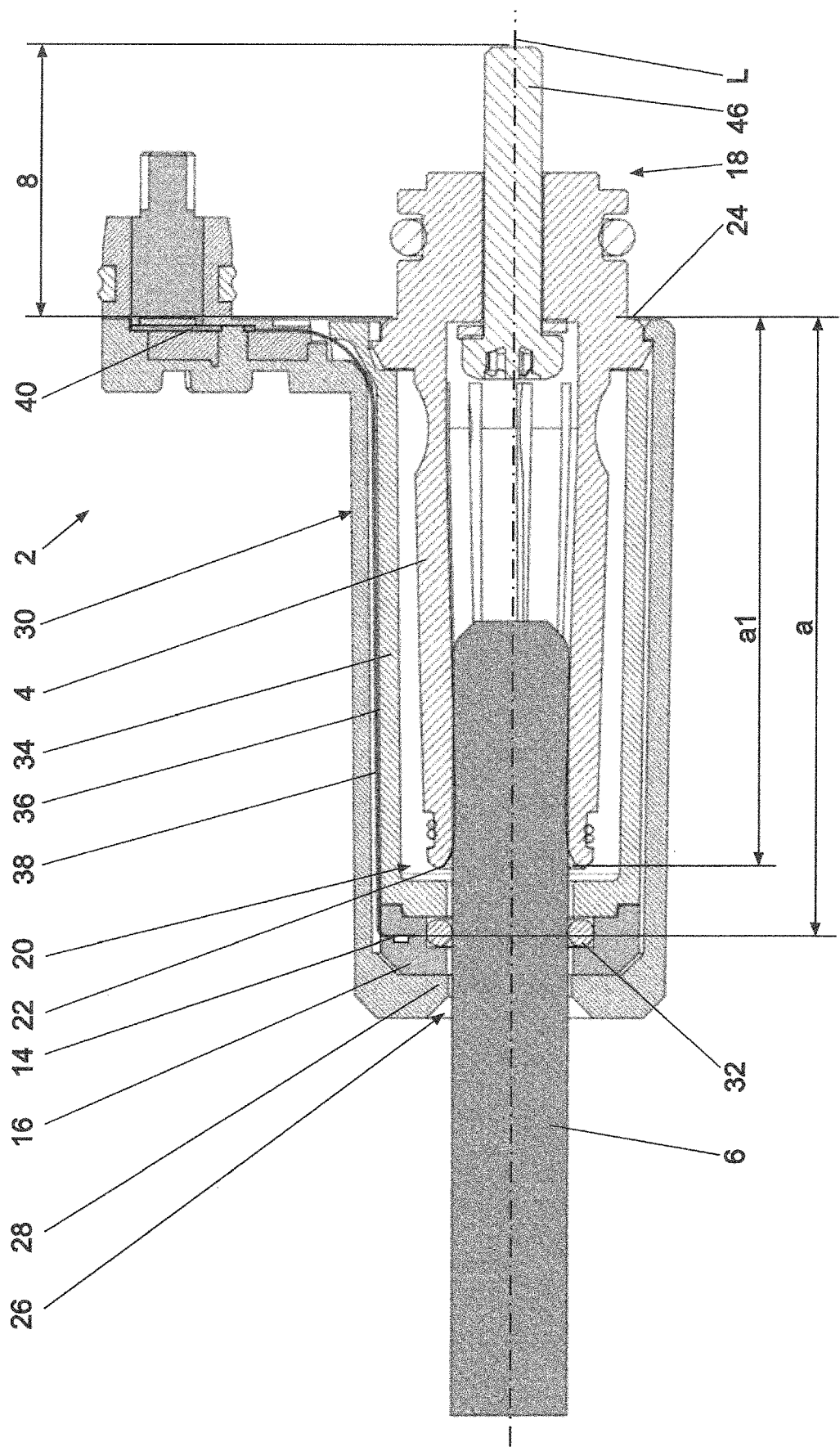
FIG. 1E is a cross section of the load-contact module from FIG. 1A along sectional line 1E-1E shown in FIG. 1C.

FIG. 1A to 1E show a load-contact module 2 according to the invention for a plug-in charging connection.

The load-contact module 2 has a load contact 4, which is designed to electromechanically contact a load contact 6 to be inserted and/or slid on.

The load-contact module 2 has a mounting portion 8, which is designed to connect the load-contact module 2 to a support 10 of a charging plug 12 and/or of a charging socket.

The load-contact module 2 has a temperature sensor 14, which is provided for the temperature monitoring of a charging process. The temperature sensor 14 is at a distance a from the mounting portion 8.

In the present case, the temperature sensor 14 is received and cast in a thermally conductive plastics material 16.

The load contact 4 has a first end 18 which is associated with the mounting portion 8. The load contact 4 has a second end 20 which is remote from the first end 18.

A distance a1 between an end face 22 of the load contact 4 formed at the second end 20 of the load contact 4 and the mounting portion 8 is smaller than the distance a between the temperature sensor 14 and the mounting portion 8.

The distances a, a1 are measured along a longitudinal axis L of the load-contact module 2. The mounting portion 8 has an end surface 24 which forms an axial stop for mounting the load-contact module 2 at a contact point of the load-contact module in the support 10. The distance a between the temperature sensor 14 and the mounting portion 8 is therefore an axial distance a measured along the longitudinal axis L between the temperature sensor 14 and the end surface 24 of the mounting portion 8. In the present case, the temperature sensor 14 is arranged between the end face 22 of the load contact 4 and a collar 28 of a housing 30 of the load-contact module 2, which collar defines an insertion opening 26.

The load-contact module 2 comprises a thermally conducting contact spring 32, which is designed as a metal round-wire contact spring 32 in the present case. The round-wire contact spring 32 is configured to abut the pin contact 6 over the periphery. The round-wire contact spring 32 serves to conduct heat in the direction of the temperature sensor 14.

If the pin contact 6 heats up during a charging process, heat is therefore conducted via the round-wire contact spring 32 and the thermally conductive plastics material 16 to the temperature sensor 14.

In the present case, the load contact 4 is a socket contact 4, which has an opening for inserting the pin contact 6. The load contact 4 is surrounded over the periphery by an insulation housing 34. A flexible conducting track 38 is guided on a lateral surface 36 of the insulation housing 34 facing away from the load contact 4. The flexible conducting track 38 is coupled to the temperature sensor 14. The flexible conducting track 38 is guided from the temperature sensor 14 to a printed circuit board 40 and is connected to the printed circuit board 40.

In the present case, the distance a between the temperature sensor 14 and the mounting portion 8 is greater than 20 mm.

FIGS. 2A, 2B and 2C show the charging plug 12 according to the invention for charging a traction battery of a motor vehicle, which comprises an active cooling device 44 integrated in a charging-plug housing 42. The cooling device 44 is provided for cooling components of the charging plug which are involved in transferring charging power during a charging process. The charging plug 12 has two load-contact modules 2 according to the invention, which are each interchangeably and detachably fastened to the support 10 by means of a screw 46.

The invention claimed is:

1. A load-contact module for a plug-in charging connection, comprising:
    a first load contact, which is designed to electromechanically contact a second load contact to be inserted and/or slid on the first load contact;
    a mounting portion, which is designed to connect the load-contact module to a support of a charging plug and/or of a charging socket;
    a temperature sensor for monitoring a temperature of a charging process; and
    an insertion opening for receiving the second load contact to be inserted and/or slid on the first load contact;
    wherein the first load contact extends between a first end and a second end thereof in a direction of an axis of the load-contact module, wherein the first end of the first load contact is associated with the mounting portion and the second end is remote from the first end;
    wherein the temperature sensor is arranged between the second end of the first load contact and the insertion opening in the direction of the axis of the load-contact module; and
    wherein the temperature sensor is at a first distance from the mounting portion in the direction of the axis of the load-contact module, the insertion opening is at a second distance from the mounting portion in the direction of the axis of the load-contact module, and the first distance is less than the second distance.

2. The load-contact module according to claim 1, wherein the temperature sensor is received in a thermally conductive plastics material and/or is cast in a thermally conductive plastics material at least in part.

3. The load-contact module according to claim 1, wherein the temperature sensor is arranged between the second end of the first load contact and a collar of a housing of the load-contact module, which collar defines the insertion opening.

4. The load-contact module according to claim 1, wherein the mounting portion has an end surface which forms an axial stop for mounting the load-contact module on the support; and
    wherein the first distance is defined between the temperature sensor and the end surface of the mounting portion.

5. The load-contact module according to claim 1, wherein a thermally conducting contact spring is designed to abut the second load contact; and
    wherein the contact spring is provided to conduct heat in the direction of the temperature sensor.

6. The load-contact module according to claim 5, wherein the contact spring abuts a thermally conductive plastics material.

7. The load-contact module according to claim 1, wherein the first load contact is a socket contact, which has an opening for inserting a pin contact;
    wherein the first load contact is surrounded over the periphery by an insulation housing;
    wherein a flexible conducting track is guided on a lateral surface of the insulation housing facing away from the first load contact;
    wherein the flexible conducting track is coupled to the temperature sensor; and
    wherein the flexible conducting track is guided from the temperature sensor to a printed circuit board and is connected to the printed circuit board.

8. The load-contact module according to claim 1, wherein the first distance is 10 mm or greater.

9. A charging plug for a motor vehicle, comprising:
    an active and/or passive cooling device designed to cool load contacts or components required for transferring charging power; and
    a load contact module including:
        a first load contact, which is designed to electromechanically contact a second load contact to be inserted and/or slid on the first load contact;
        a mounting portion, which is designed to connect the load-contact module to a support of a charging plug and/or of a charging socket;
        a temperature sensor for monitoring a temperature of a charging process; and
        an insertion opening for receiving the second load contact to be inserted and/or slid on the first load contact;
        wherein the first load contact extends between a first end and a second end thereof in a direction of an axis of the load-contact module, wherein the first end of the first load contact is associated with the mounting portion and the second end is remote from the first end,
        wherein the temperature sensor is arranged between the second end of the first load contact and the insertion opening in the direction of the axis of the load-contact module; and
        wherein the temperature sensor is at a first distance from the mounting portion in the direction of the axis of the load-contact module, the insertion opening is at a second distance from the mounting portion in the direction of the load-contact module, and the first distance is less than the second distance.

* * * * *